United States Patent [19]
Hashimoto

[11] Patent Number: 6,028,966
[45] Date of Patent: Feb. 22, 2000

[54] IMAGE READING APPARATUS AND METHOD INCLUDING PRE-SCANNING

[75] Inventor: Yoshiyuki Hashimoto, Toyokawa, Japan

[73] Assignee: Minolta Co., Ltd., Osaka, Japan

[21] Appl. No.: 08/623,929

[22] Filed: Mar. 28, 1996

[30] Foreign Application Priority Data

Mar. 30, 1995 [JP] Japan .................................... 7-073887

[51] Int. Cl.⁷ ...................................................... G06K 9/00
[52] U.S. Cl. ............................................ 382/262; 382/319
[58] Field of Search .................................... 382/254, 255, 382/260, 262, 263, 264, 265, 266, 272, 274, 275, 282, 283, 307, 308, 312, 318, 319, 321, 322, 323, 324, 240, 227, 210, 261, 276, 278, 279, 284, 285, 302, 309, 151, 132; 250/587; 356/237; 378/58; 358/449, 466, 497; 355/20, 68, 71, 81, 83

[56] References Cited

U.S. PATENT DOCUMENTS

| | | | |
|---|---|---|---|
| 3,764,980 | 10/1973 | Dansac et al. | 340/146.3 ED |
| 4,344,699 | 8/1982 | McIntosh | 355/20 |
| 4,736,439 | 4/1988 | May | 382/262 |
| 4,763,200 | 8/1988 | Nakatani et al. | 358/282 |
| 4,851,678 | 7/1989 | Adachi et al. | 250/327.2 |
| 4,979,136 | 12/1990 | Weiman et al. | 382/274 |
| 5,122,873 | 6/1992 | Golin | 382/240 |
| 5,351,307 | 9/1994 | Prejean-Lefevre | 382/8 |

*Primary Examiner*—Leo H. Boudreau
*Assistant Examiner*—Bijan Tadayon
*Attorney, Agent, or Firm*—Burns, Doane, Swecker & Mathis, LLP

[57] ABSTRACT

An image reading apparatus wherein the original image to be read by main scanning is prescanned first to obtain reading parameters optimum for the main scanning, is characterized in that the apparatus processes image data picked up at predetermined dots from among all image data by a median filter during the pre-scanning, and processes all image data by the median filter during the main scanning.

22 Claims, 7 Drawing Sheets

IMAGE READING APPARATUS AND METHOD INCLUDING PRE-SCANNING

BACKGROUND OF THE INVENTION

The present invention relates to an image reading apparatus wherein the size of a median filter is changed to thereby remove noise from the data to be obtained by prescanning.

Image reading apparatus include, for example, microfilm reader-scanners for reading image frames or like original images recorded on microfilm.

To obtain images of optimum density by such microfilm reader-scanners, it is common practice to prescan original images before the main scanning thereof for automatically setting the amount of exposure to be given by a light source to the image for reading (automatic exposure setting, AE), recognizing the image frame (image size) and performing other procedures. For prescanning, data is picked up by thinning out data from the entire image and is then stored in a memory. This is because a memory of great capacity and a prolonged period of processing time are required for manipulating the entire image data. The data picked up and stored by the prescanning is used for determining reading parameters (such as the amount of exposure, variation in magnification, etc.) which are optimum for the main scanning.

In the case where the optimum parameters for the main scanning are determined based on the thinned-out data which is picked up, the decrease in the number of data items picked up leads to a corresponding reduction in the processing time, whereas the picked-up data, if containing noise, results in a higher probability of determining erroneous parameters and a likelihood of exerting an adverse effect on the determination of parameters. Accordingly, there is a need to remove the noise from the data to be picked up as thinned out. With the conventional method of removing noise, an increased number of data items are picked up to lessen the probability of the picked-up data containing noise, and the average value of the picked-up data items is calculated. However, the conventional method of removing noise by the software of calculating the average value takes time to calculate the average value, and the analysis of the prescanning data requires an increased period of time for this reason and also because of the increase in the number of image data items to be sampled, consequently entailing the likelihood of retarding the operation of the scanner itself.

SUMMARY OF THE INVENTION

An object of the present invention is to overcome the problems of the prior art, and more particularly to provide an image reading apparatus adapted to remove noise efficiently within a short period of time from the data to be obtained by prescanning.

To achieve the above object, the present invention provides an image reading apparatus wherein the original image to be read by main scanning is prescanned first to obtain reading parameters optimum for the main scanning, the apparatus being characterized in that the apparatus comprises control means for processing image data, as picked up at a predetermined spacing, by a median filter during the prescanning and processing data as to the entire image by the median filter during the main scanning.

The control means is characterized in that the means includes a median filter circuit for processing the given image data by the median filter, and that the median filter processing tasks to be performed respectively during the prescanning and the main scanning are changed over from one task to the other by changing a clock signal for driving the median filter circuit.

The above and other objects, advantages and features of the invention will become apparent from the following description thereof taken in conjunction with the accompanying drawings which illustrate a specific embodiment of the invention.

BRIEF DESCRIPTION OF THE DRAWINGS

In the following description, like parts are designated by like reference numbers throughout the several drawings.

DETAILED DESCRIPTION OF THE INVENTION

An embodiment of the invention will be described below in detail with reference to the drawings. The embodiment is a microfilm reader-scanner which is an example of an image reading apparatus of the invention.

Figure 3:
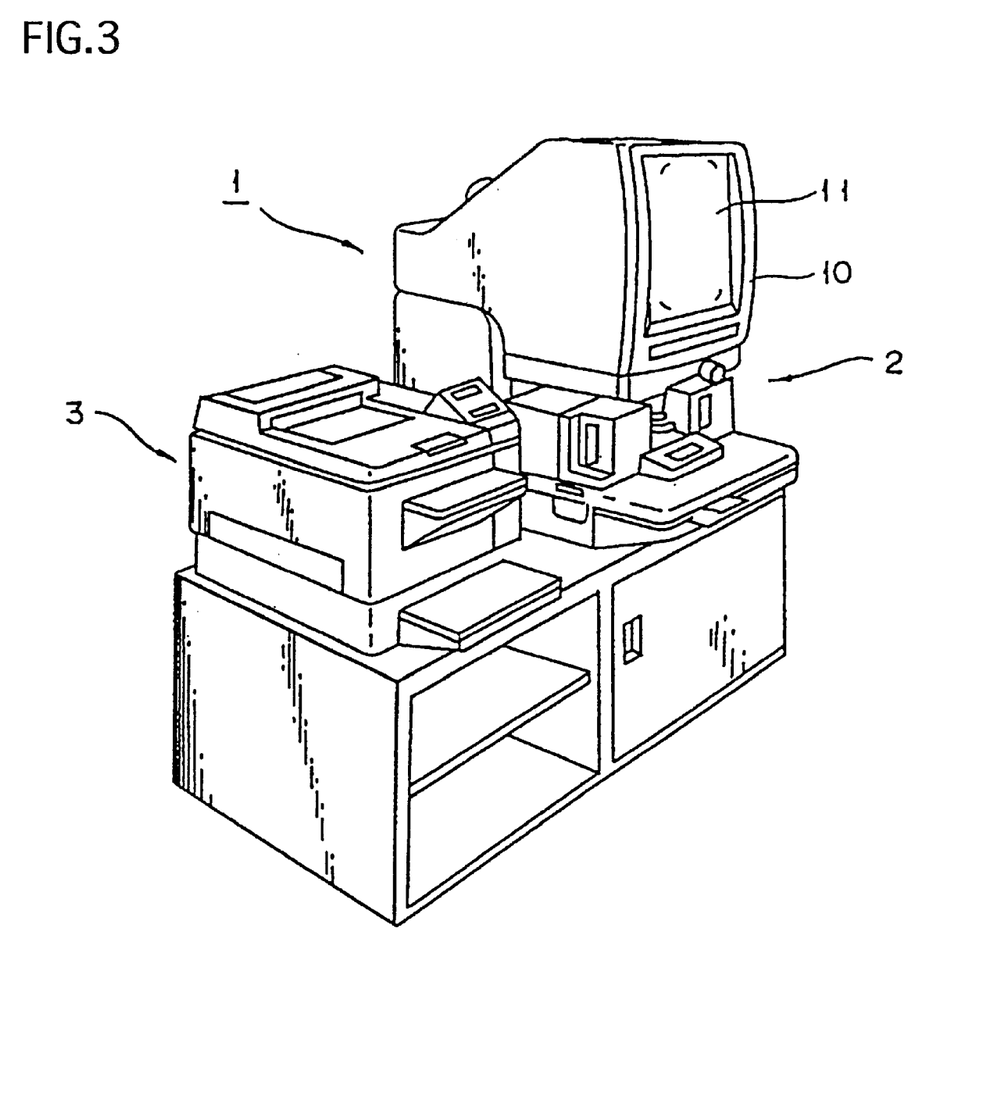
FIG. 3 is a view showing the appearance of a digital microfilm reader-printer having the reader-scanner incorporated therein.

FIG. 3 is a view showing the appearance of a digital microfilm reader-printer to which the image reading apparatus of the invention is applied.

The digital microfilm reader-printer 1 comprises the combination of microfilm reader-scanner 2 and laser beam printer 3. The microfilm reader-scanner (hereinafter referred to merely as "reader-scanner") 2 is a device for reading original images recorded on microfilm. The laser beam printer 3 is a device for printing on paper the image data read.

Figure 4:
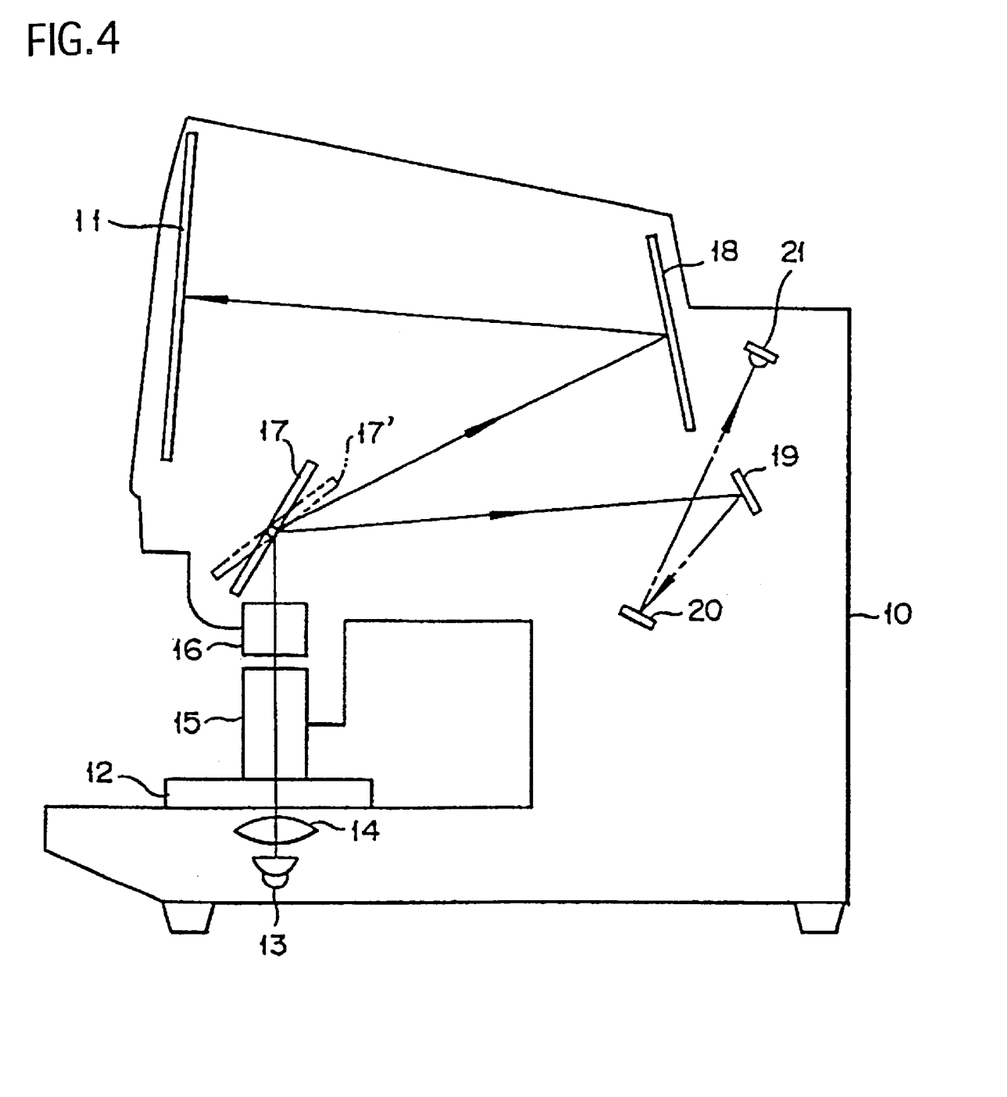
FIG. 4 is a sectional diagram showing the interior construction of the reader-scanner.

FIG. 4 is a sectional diagram showing the interior construction of the reader-scanner 2 shown in FIG. 3.

With reference to the drawing, a screen 11 is provided on the front side of housing 10 of the reader-scanner 2. An unillustrated microfilm as supported by a microfilm carrier 12 is loaded below the screen 11. A light source (e.g., halogen lamp) 13 is incorporated in a lower portion of the housing 10 for emitting light, which is concentrated by a condenser lens 14 to irradiate the microfilm. A projection lens 15 and an image rotating prism 16 thereabove are arranged above the microfilm carrier 12. A scanning mirror 17 is rotatably disposed further above the prism 16. A reader optical path (solid line) and a scanner optical path (broken line) are changed over from one path to the other by the scanning mirror 17, which also functions to scan the image on the microfilm. The reader optical path is fixedly provided with a reflecting mirror 18 for projecting on the screen 11 the light passing through the microfilm and reflected at the mirror 18. Reflecting mirrors 19, 20 and a charge coupled device or like line sensor 21 are arranged successively in the scanner optical path for electrically reading the image from the microfilm.

The operation of the reader-scanner 2 thus constructed will be described next briefly. First, when the power source is turned on, a reader mode is selected, whereupon the scanning mirror 17 is rotated to the reader optical path position. This causes the light from the light source 13 to be concentrated by the condenser lens 14 to irradiate the microfilm loaded on the film carrier 12. The image on the microfilm is projected as enlarged onto the screen 11 via the projection lens 15, image rotating prism 16, scanning mirror 17 and reflecting mirror 18 for perusal. When the original image thus projected on the screen 11 is to be printed on paper, a read command is keyed in on the operation panel (not shown) for a change-over to a read mode to bring the scanning mirror 17 alternatively to the scanner optical path position.

With the rotation of the scanning mirror 17, the image on the microfilm is scanned by the line sensor 21 line by line by way of the reflecting mirrors 19, 20 and photoelectrically converted into an electrical image signal. The image signal is subjected to the specified image processing to be described below and fed to the laser beam printer 3 for printing.

Figure 1:
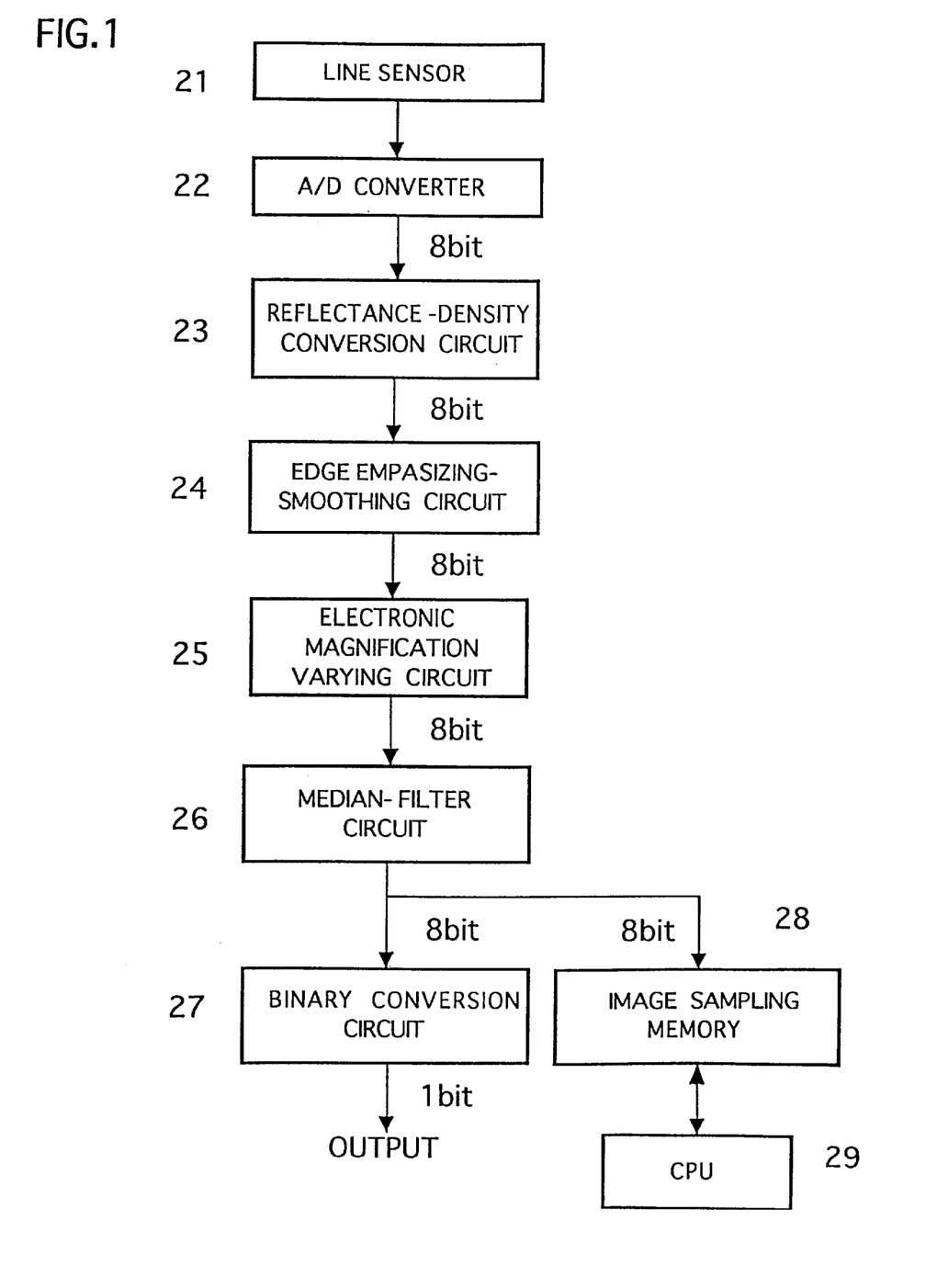
FIG. 1 is a block diagram showing an example of an image processing circuit of a reader-scanner embodied as an image reading apparatus of the invention.

FIG. 1 is a block diagram showing an example of an image processing circuit of the reader-scanner 2.

The image data read by the line sensor 21 is converted to a digital signal (e.g., 8-bit signal) from an analog signal by an A/D (analog/digital) converter 22. The digitized 8-bit image data is fed successively to a reflectance-density conversion circuit 23 for varying the threshold value for output signal ON/OFF to give a proper image density (for example, for fogged images, the threshold value is raised to give a lower image density for correction), an edge emphasizing-smoothing circuit 24 for effecting such control that the boundary (edge) of the image to be output is emphasized or smoothed in conformity with the state (density) of neighboring pixels, an electronic magnification varying circuit 25 for altering the magnification of the image and a median filter circuit 26 for processing the image data by a median filter. The resulting data is then fed to a binary conversion circuit 27 for converting the data to 1-bit binary data of white and black. Thus a series of image data items flows to give an image output by reading the original image, i.e., by a procedure termed the main scanning. For the main scanning, the above-mentioned processing with the median filter is effective for removing background particulate noise which is peculiar to the microfilm.

A preparatory procedure termed prescanning is performed before the main scanning for AE and detecting the image frame. In prescanning unlike the main scanning, some of the image data, e.g., data as picked up at a spacing of 16 dots in the vertical and horizontal directions of the image for thinning, is stored in a prescanning image sampling memory 28 instead of converting the data to binary data by the binary conversion circuit. This reduces the number of data items to be picked up to one 256th (16×16=256) of the number of data as to the entire image.

The data stored in the image sampling memory 28 is analyzed by a CPU 29, which calculates optimum values of reading parameters for the main scanning (such as the amount of exposure, the amount of edge emphasis, magnification, whether to make negative-positive reversal, etc.). If all the data as to the entire image is used for analysis in the prescanning, the memory capacity and calculation time required become very great as previously stated, so that usually used is the thinned-out data picked up at a spacing of a specified number of dots in both vertical and horizontal directions as described above.

It is desired that the image data to be stored in the image sampling memory 28 be free from image noise. Especially in the case where the data picked up as thinned out for the entire image is used for analysis as in the present embodiment, the analysis is prone to yield an erroneous result if the data contains noise. To avoid the error, the data obtained by prescanning (prescanning data) is first processed by a median filter serving as a noise removing filter and then stored in the image sampling memory 28 for use in the analysis.

Figure 5:
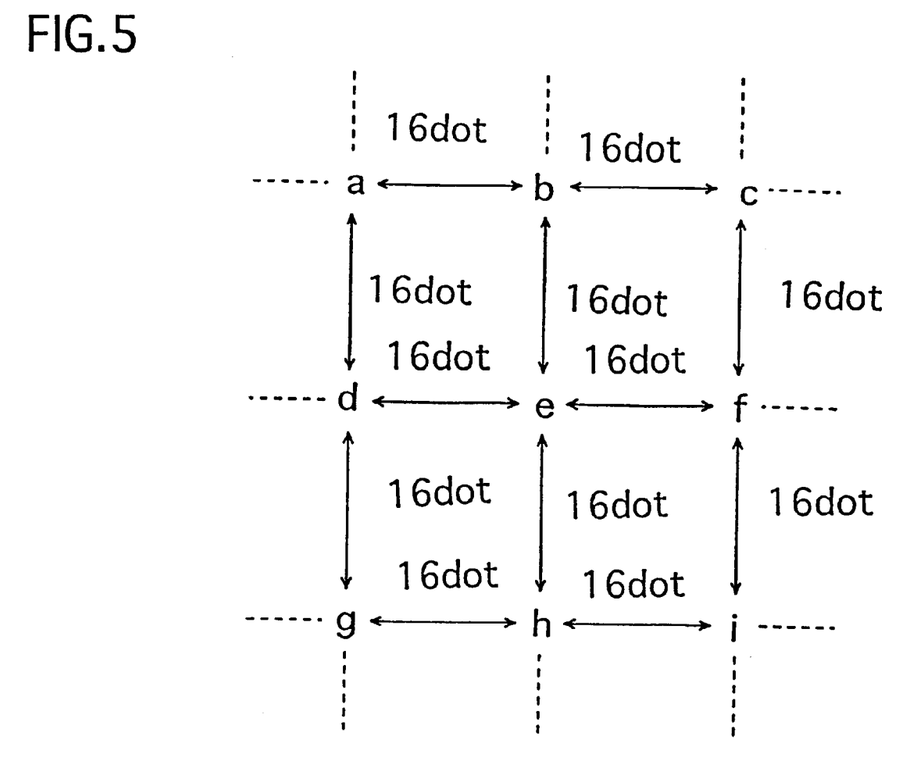
FIG. 5 is a schematic diagram showing a median filter for use in prescanning.

The median filter in the median filter circuit 26 is a filter for rearranging data items around a particular pixel to be given attention in the order of magnitude and replacing the value of the particular pixel by the median of the data. For example when nine data items arranged around the particular pixel and inclusive of that pixel are rearranged in the order of magnitude, the fifth item in the order, which is the median of the entire data, is substituted for the data item of the particular pixel for use as such. This will be described in greater detail, for example, with reference to FIG. 5 which is a diagram showing the median filter for use in prescanning. Depicted in the diagram are nine data items a, b, c, d, e, f, g, h and i among which e is the particular pixel receiving attention, the other items being 16 dots away therefrom in the horizontal and vertical directions. Assuming that the image data items are in the order of a, c, e, h, b, i, g, f, d in magnitude, the value of e is replaced by the value of the fifth item b which is the median before the data is stored in the image sampling memory 28. In this way, the thinned-out data is processed by the median filter of similary thinned-out size, whereby noise can be effectively removed from the prescanning data. The reading parameters required for the main scanning can therefore be determined from a reduced quantity of prescanning data free of errors.

Figure 6:
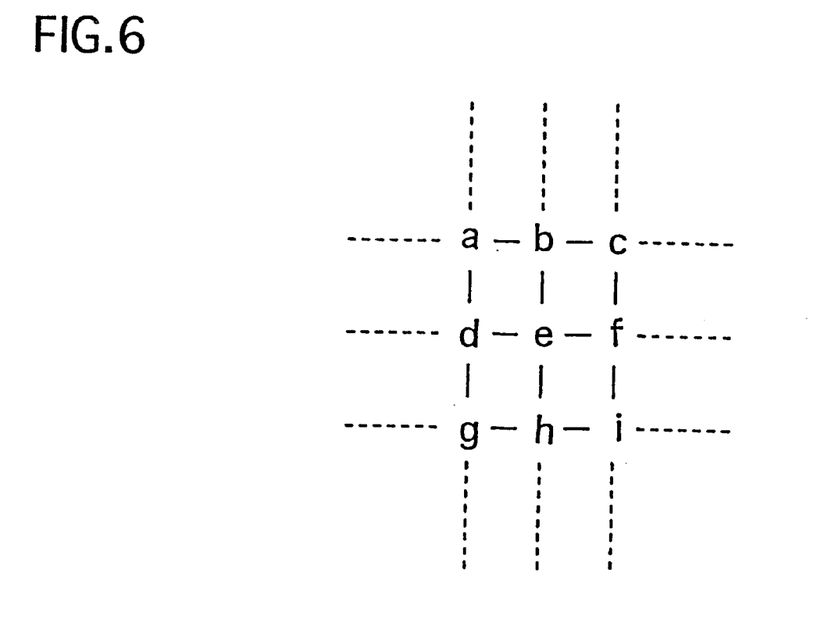
FIG. 6 is a schematic diagram showing a median filter for use in main scanning.

With reference to FIG. 6 which is a diagram showing a median filter for use in the main scanning, the image data obtained by the main scanning is output with the median of the adjacent nine image data items a to i substituted for the value of the data item of the particular pixel e receiving attention. This method is generally known as a method of removing image noise without reducing the resolution and is effective for removing background particulate noise which is peculiar to microfilms as previously stated.

In this way, the median filter processing is performed for the image data at a spacing of a specified number of dots (16 dots) in prescanning, and for the adjacent image data (entire image) in the main scanning, so that median filters of different sizes are used for the prescanning and the main scanning. To ensure a cost reduction according to the present embodiment, the two median filters of different sizes are realized by the same circuit 26 by changing the clock cycle to be given. Thus, the median filters of different sizes are combined to realize the functions of the two median filters by diminished hardware.

Figure 2:
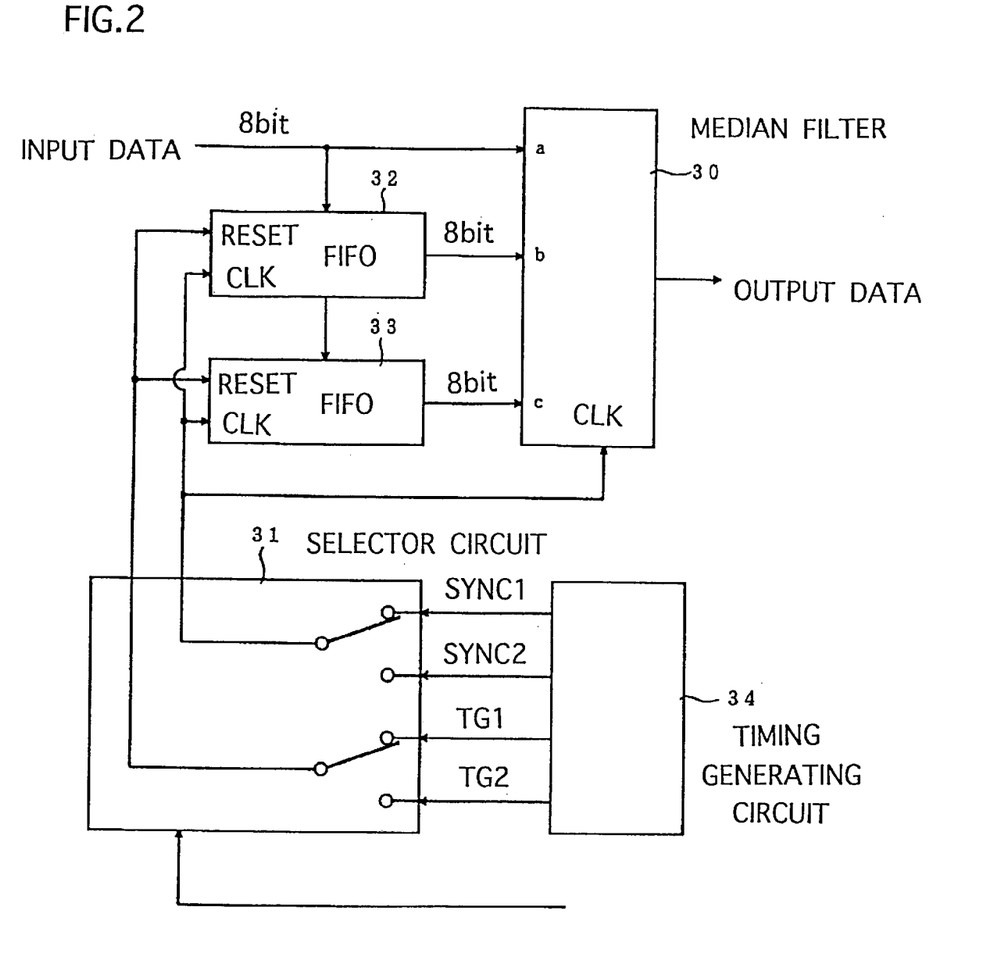
FIG. 2 is a diagram showing the construction of an example of median filter circuit.

FIG. 2 is a diagram showing the construction of an example of median filter circuit 26 so designed.

Figure 7:
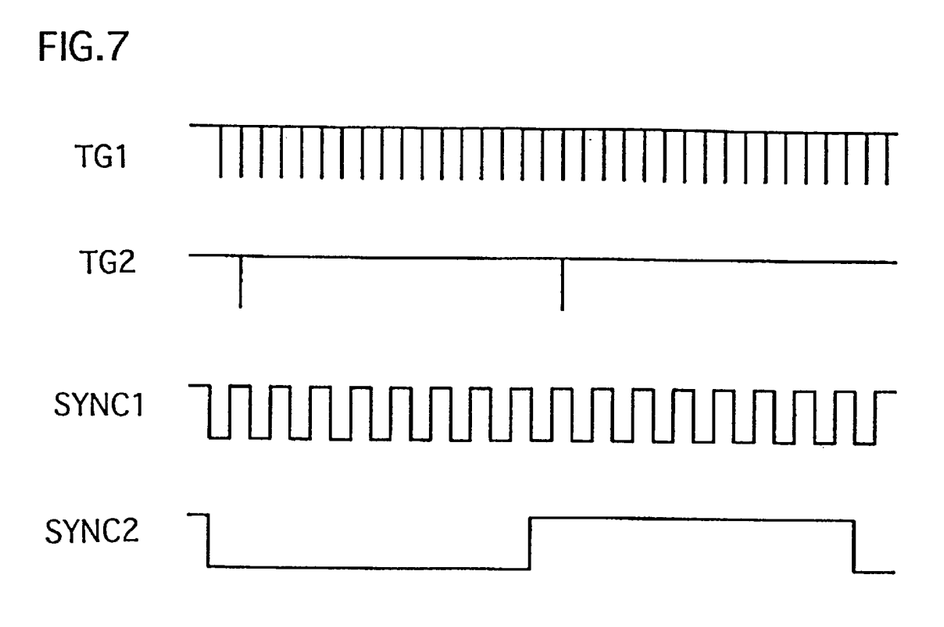
FIG. 7 is a waveform diagram showing clock signals for driving the median filter.

The median filter circuit 26 has a median filter 30, a selector circuit 31 for changing a clock for driving the median filter 30, FIFOs 32, 33 which are memories from which the data written first is retrieved first, and a timing generating circuit 34 for producing timing signals. The size of the median filter 30 is changed by changing the clock signal for driving the median filter 30 by the selector circuit 31. For example, the primary scan synchronizing signal TG and pixel clock signal SYNC to be produced by the timing generating circuit 34 are changed over to (1) for the main scanning, while these signals are changed over to (2) for the prescanning. FIG. 7 shows examples of waveforms of primary scan synchronizing signals TG (1), (2) and pixel clock signals SYNC (1), (2). With reference to the drawing, indicated at (1) is a main scanning clock with a cycle of 1 dot, and at (2) a prescanning clock with a cycle of 16 dots. Thus, hardware is effectively used to realize two functions, i.e., median filter processing for the main scanning and median filter processing for the prescanning.

Figure 8:
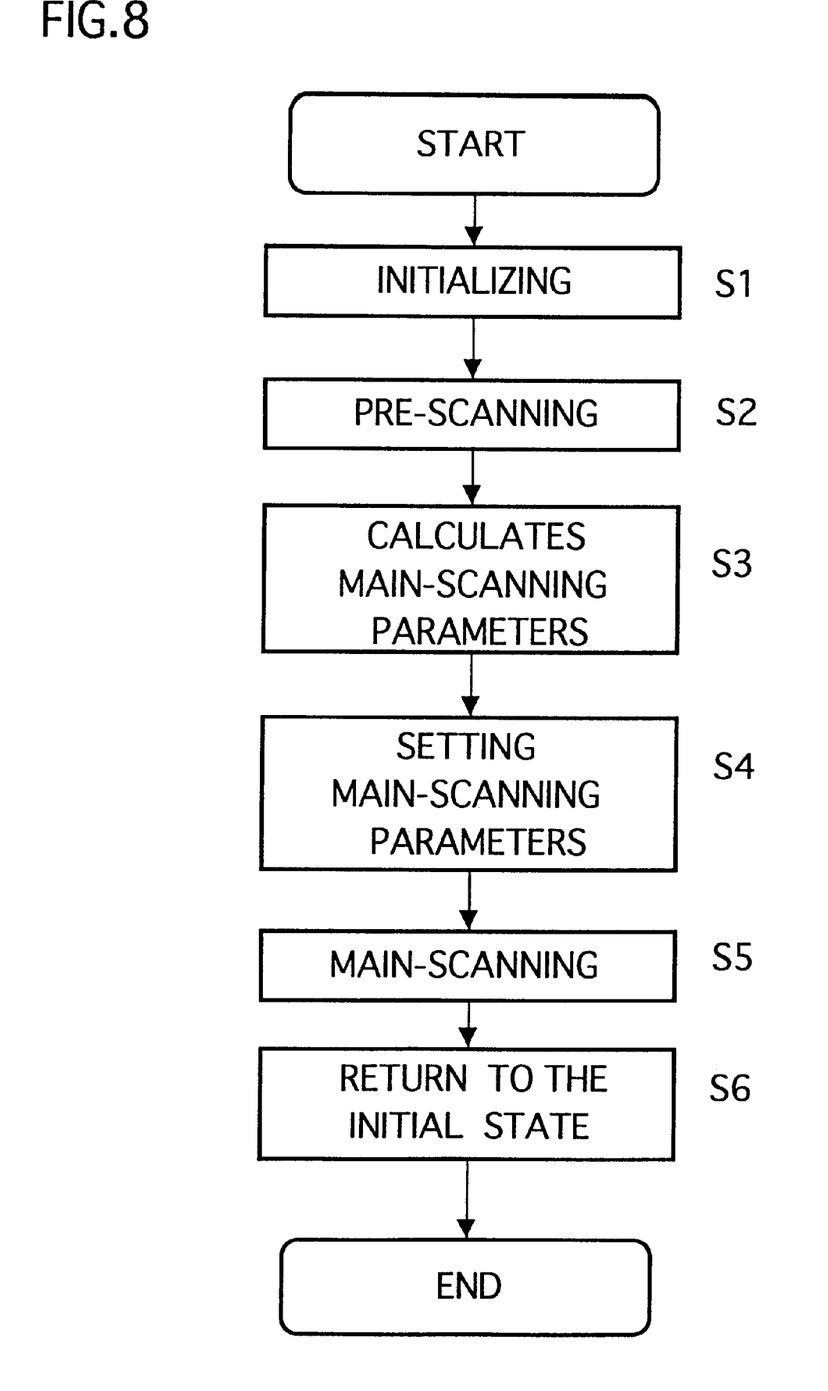
FIG. 8 is a flow chart showing the operation of a control system of the reader-scanner.

FIG. 8 is a flow chart showing the operation of control system of the reader-scanner 2 having the foregoing construction.

First, the system is initialized in step S1 to prepare the reader-scanner 2 for prescanning. For example, the amount of light to be emitted by the light source 13 is set, and the scanning mirror 17 is moved to the scan start position. At the same time, the clock for driving the median filter 30 is set to the prescanning clock (2) (see FIGS. 2 and 7).

The image to be read is prescanned for checking in the next step S2. More specifically, with the scanning movement of the scanning mirror 17, the line sensor 21 delivers an image signal, which is digitized to 8-bit image data by the A/D converter 22, then subjected to predetermined image processing and thereafter processed by the median filter of specified size (every 16 dots) in the median filter circuit 26 for the removal of image noise. The noise-free data is stored in the image sampling memory 28.

On completion of the storage of data in the memory 28, the CPU 29 calculates main scanning parameters in the next step S3. More specifically, the unit analyzes the data stored in the image sampling memory 28 and determines optimum values of main scanning parameters such as the amount of light to be given by the lamp of the light source 13, whether to effect negative-positive reversal in the reflectance-density conversion circuit 23, the amount of edge emphasis to be made by the edge emphasizing-smoothing circuit 24 and the magnification to be set for the electron magnification varying circuit 25. In addition to such exposure value and image processing parameters for the main scanning, the size of the original is also detected by reading the original frame. These procedures are carried out based on the noise-free data and therefore afford accurate results.

On completion of the calculation of the main scanning parameters, step S4 follows to set the main scanning parameters based on the results. These parameters are optimum amount of light, whether to effect negative-positive reversal, amount of edge emphasis, magnification, etc. At the same time, the clock for driving the median filter 30 is changed over to the main scanning clock (1) (see FIGS. 2 and 7).

On completion of the parameter setting, the main scanning is executed to read the original image and output image data (step S5). More specifically, the original image is scanned again by the scanning mirror 17 for the line sensor 21 to deliver image data, which is converted to an 8-bit digital signal by the A/D converter 22, then subjected to specified image processing successively in the reflectance-density conversion circuit 23, edge emphasizing-smoothing circuit 24 and electronic magnification varying circuit 25, and further fed to the median filter circuit 26, in which the adjacent image data items (entire image) are processed by the median filter for the removal of noise. The resulting data is converted to 1-bit binary data of white and black by the binary conversion circuit 27 and thereafter output.

On completion of the main scanning, the entire system is returned to the initial state (step S6), whereby the foregoing sequence of operations is completed.

According to the present embodiment, therefore, median filter processing is performed for image data at a spacing of a specified number of dots in prescanning. This makes it possible for hardware to sample noise-free representative data and to remove noise from the prescanning data more efficiently within a shorter period of time than when software is used as in the prior art, consequently rendering the reader-scanner operable at a higher speed.

Furthermore, the main scanning median filter and the prescanning median filter of different sizes are provided by the same circuit, and the size of the median filter is made changeable by changing the clock signal for driving the median filter 30. This ensures effective use of the circuit for a cost reduction.

The embodiment described is a microfilm reader-scanner as an example of image reading apparatus of the invention, whereas the invention is of course not limited thereto.

Although the prescanning data is picked up every 16 dots for thinning, this numerical value is not limited to 16 dots but can be an optional value. Furthermore, the thinning spacing may be made variable by the operator.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading apparatus wherein a pre-scanning operation is performed before a main-scanning operation which reads image data so as to obtain reading parameters for the main-scanning, comprising:

a median filter processor for processing image data using a median filter, wherein said median filter processing is performed for image data picked up at predetermined dots thinned out from among an entire image data when said pre-scanning operation is performed, and performed for substantially the entire image data when said main-scanning operation is performed.

2. An image reading apparatus according to claim 1, wherein a number of the image data picked up at the predetermined dots is smaller than a number of dots in the entire image data.

3. The image reading apparatus according to claim 1, wherein said median filter is a noise removing filter.

4. The image reading apparatus according to claim 1, wherein said median filter processor detects a value of an interest pixel and each value of surrounding pixels of the interest pixel, judges a median magnitude value from among all detected values, and replaces the value of the interest pixel with the median magnitude value.

5. The image reading apparatus according to claim 1, wherein said median filter processor detects a value of an interest pixel and values of eight pixels surrounding the interest pixel, judges a fifth magnitude value from among the number of nine detected values, and replaces the value of the interest pixel with the fifth magnitude value.

6. The image reading apparatus according to claim 1, wherein said median filter processor performs processing for image data picked up at every 16 dots in the vertical and horizontal directions of the image when said pre-scanning operation is performed.

7. The image reading apparatus according to claim 1, wherein said median filter processing for the pre-scanning operation and said median filter processing for the main-scanning operation are changed by changing a clock signal for driving the median filter.

8. An image reading method comprising the steps of:

pre-scanning image data;

picking up image data at predetermined thinned out dots from among all image data scanned by pre-scanning;

processing the picked up image data by a median filter so as to remove noise therefrom;

obtaining reading parameters for main-scanning based on image data processed by the median filter;

main-scanning all the image data using the obtained reading parameters; and processing substantially all image data by a median filter so as to remove noise therefrom.

9. The image reading apparatus according to claim 1, wherein said predetermined thinned out dots comprise a plurality of selected dots interspersed amongst a larger number of non-selected dots.

10. The image reading apparatus according to claim 9, wherein at least one of said selected dots is separated from a closest neighboring selected dot by at least one non-selected dot.

11. The image reading apparatus according to claim 10, wherein every selected dot is separated from its closest neighboring selected dots by a predetermined number of non-selected dots.

12. The image reading apparatus according to claim 1, further including a sensor for imputing said image data.

13. The image reading apparatus according to claim 12, wherein said sensor comprises a line sensor.

14. The image reading method according to claim 8, wherein said predetermined thinned out dots comprise a plurality of selected dots interspersed amongst a larger number of non-selected dots.

15. The image reading method according to claim 14, wherein at least one of said selected dots is separated from a closest neighboring selected dot by at least one non-selected dot.

16. The image reading method according to claim 15, wherein every selected dot is separated from its closest neighboring selected dots by a predetermined number of non-selected dots.

17. A median filter circuit for an image reading apparatus, said median circuit filter comprising:

a timing generating circuit for specifying at least a first and second timing signals;

a selector circuit for selecting one of said first and second timing signals to produce a selected timing signal on the basis of whether a pre-scanning mode or main scanning mode has been activated; and a median filter unit for receiving said selected timing signal and for changing a size of a median filter in accordance with said selected timing signal, and for processing image data using said median filter of selected size.

18. The median filter circuit according to claim 17, wherein, in said pre-scanning mode, said median filter unit processes a number of selected dots interspersed amongst a number of non-selected dots.

19. The median filter circuit according to claim 18, wherein, in said pre-scanning mode, at least one of said selected dots is separated from a closest neighboring selected dot by at least one non-selected dot.

20. The median filter circuit according to claim 18, wherein, in said main scanning mode, said median filter unit processes a larger number of selected dots compared to said pre-scanning mode.

21. An image reading apparatus wherein a pre-scanning operation is performed before a main-scanning operation which reads image data so as to obtain reading parameters for the main-scanning, comprising:

a median filter processor for processing image data picked up at predetermined dots thinned out from among an entire image data by using a median filter when said pre-scanning operation is performed.

22. An image reading apparatus as claimed in claim 21, wherein said predetermined dots are regularly dispersed among said entire image.

* * * * *